United States Patent [19]
Reifenberger et al.

[11] Patent Number: 5,507,534
[45] Date of Patent: Apr. 16, 1996

[54] HYDRAULIC BALL STYLE SWIVEL FITTING

[75] Inventors: Mark G. Reifenberger, Norcross; Michael D. Hartley, Roswell; Alan Harben, Dacula, all of Ga.

[73] Assignee: Nordson Corporation, Westlake, Ohio

[21] Appl. No.: 235,095

[22] Filed: Apr. 29, 1994

[51] Int. Cl.⁶ ..................................... F16L 47/06
[52] U.S. Cl. .......................................... 285/132; 285/271
[58] Field of Search .................... 285/261, 263, 285/190, 168, 163, 164, 166, 271, 132

[56] References Cited

U.S. PATENT DOCUMENTS

| | | |
|---|---|---|
| 1,669,949 | 5/1928 | Reynolds . |
| 1,838,740 | 12/1931 | Burnham ............... 285/190 X |
| 2,175,752 | 10/1939 | Gray ........................ 285/166 |
| 2,196,783 | 4/1940 | Shook ....................... 299/141 |
| 2,377,196 | 5/1945 | Walley ................... 285/271 X |
| 2,466,316 | 4/1949 | Jovanovich ............... 285/261 |
| 2,519,147 | 8/1950 | Miller ..................... 285/97.3 |
| 2,557,106 | 6/1951 | Hughes .................... 299/145 |
| 2,585,178 | 2/1952 | Sherwood ............. 285/132 X |
| 2,772,898 | 12/1956 | Seeler ...................... 285/190 |
| 2,985,385 | 5/1961 | Bowers et al. ............ 239/456 |
| 3,003,703 | 10/1961 | Lambton .................. 239/309 |
| 3,224,793 | 12/1965 | Benjamin ................... 285/8 |
| 3,332,580 | 7/1967 | Spencer et al. ........... 222/146 |
| 3,334,818 | 8/1967 | Moen ...................... 239/428.5 |
| 3,334,926 | 8/1967 | Faccou ................. 285/190 X |
| 3,471,091 | 10/1969 | Baker ....................... 239/416 |
| 3,663,043 | 5/1972 | Walton ..................... 285/113 |
| 3,722,926 | 3/1973 | Fukushima ............... 285/261 |
| 3,791,585 | 2/1974 | Warren ..................... 239/256 |
| 3,887,136 | 6/1975 | Anderson ................. 239/460 |
| 4,111,468 | 9/1978 | Schneider ................. 285/190 |
| 4,717,078 | 1/1988 | Arp ......................... 239/550 |
| 5,186,394 | 2/1993 | Tsuji ...................... 239/587.4 |

FOREIGN PATENT DOCUMENTS

| | | | |
|---|---|---|---|
| 208409 | 4/1940 | Switzerland ............. 285/132 |
| 8606986 | 12/1986 | WIPO ..................... 285/132 |

*Primary Examiner*—Dave W. Arola
*Attorney, Agent, or Firm*—Roger D. Emerson; Raymond J. Slattery, III

[57] ABSTRACT

A fitting (10) for dispensing fluids, such as hot melt adhesives, includes a swivel member (12) and a housing (14). The swivel member (12) has a ball (16) at one end which is received within a socket (22) of the housing (14). The swivel member (12) has a first bore (24) which intersects and cooperates with at least one secondary bore (28). The secondary bore (28) is generally perpendicular to the first bore (24) and to a conduit (54) in the housing (14). Fluid enters the first bore (24), passes into the secondary bore (28), passes into a reservoir (40) and then finally into the conduit (54) and out of the housing (14). The reservoir and the orientation of secondary bores 28 reduces or eliminates axial loading on swivel member (12) due to the internal fluid pressure.

20 Claims, 6 Drawing Sheets

HYDRAULIC BALL STYLE SWIVEL FITTING

This invention is directed to fittings, such as swivel fittings for directing the dispensing of viscous fluids, such as adhesives, sealants and caulks. More particularly, this invention is directed to a ball-and-socket style swivel fitting such as might be used with pressurized fluids such as hydraulic fluid or heated fluid materials such as hot melt adhesives.

It is common in the dispensing of hot melt adhesives to utilize hoses, fittings, and dispensers to transport the heated adhesives under pressure from a storage receptacle to an application point. Sometimes the hoses and dispensers are suspended from overhead supports to ease strain on the hands and arms of the human operators who use the dispensers. In some applications, such as the sealing of cartons or the assembly of products with hot melt adhesives, a hand-held applicator or dispenser may swivel so that adhesive can be dispensed at locations where it is needed. Another common application in which an applicator or dispenser preferably swivels is that of a dispenser mounted as an end-effector on a robot. The swiveling capability of the dispenser enables the robot to maneuver the dispenser as needed while reducing the possibility of kinking or tangling the hoses associated with the dispenser. This improves the operation of the mechanism and increases the life of the hose.

Due to the internal geometry of the fluid passages of prior art ball-and-socket mechanism, an axially-directed force is put on the swivel member by the internal fluid pressure. In high pressure applications, the axially-directed force is great enough to jam or crimp the swivel member against the socket within the housing so that swivelling movement of the fitting to direct the flow of the pressurized fluid is difficult or impossible. Other problems which can arise when using a swivel ball-and-socket type fitting in high pressure fluid applications include premature wear of the fitting and/or leakage of the pressurized fluid from the fitting.

It is therefore desirous to be able to dispense pressurized liquids from a ball-and-socket type swivel fitting where the fitting is durable and operable even in a high pressurized fluid application, such as the pumping of hot melt adhesives.

SUMMARY OF THE INVENTION

It is therefore an object of the invention, according to one embodiment of the invention, to provide a ball-and-socket type swivel fitting which is subject to a minimum of axial forces, even when utilized with highly pressurized fluids. This may be accomplished, for example, by providing a ball design which minimizes or eliminates axial loading on the fitting due to the internal pressure of the fluid.

It is also an object of the invention according to one embodiment of the invention, to provide a ball-and-socket type swivel fitting which has improved durability and ease of use due to the elimination of axial loading of the ball portion of the fitting due to highly pressurized fluids.

Some of the these and other objects and advantages may be accomplished according to one embodiment of the invention by an apparatus for dispensing pressurized fluid materials comprising:

a swivel member, the swivel member having a ball at a first end, the ball receivable within an associated socket, the swivel member having a first bore extending from a second end of the swivel member and terminating in and communicating with a secondary bore. A housing includes a socket therein, and has first and second ends. A conduit extends between the first end of the housing and the socket. The ball of the swivel member cooperates with the socket. The secondary bore extends from a first point on a surface of the ball to the first bore of the ball. The housing further includes a reservoir which surrounds the first point on the surface of the ball and is adapted to pass fluid from the secondary bore in the ball to the conduit in the housing.

Still further, some of these other objects and advantages may be accomplished according to another embodiment by a housing comprising:

a socket adapted to receive and rotatably and tiltably support a swivel fitting having a ball-shaped end. A reservoir within the housing surrounds a portion of the surface of the ball-shaped end of the swivel fitting. The housing further includes first and second ends and a conduit which extends between the first end of the housing and the socket and which is suitable for passing pressurized fluid from the reservoir to the first end of the housing.

Still further, some of these and other objects and advantages may be accomplished according to another embodiment of the invention by a method of dispensing pressurized fluid from a ball-and-socket type fitting while reducing the potential of the fitting binding due to axial loading on the fitting from the pressurized fluid, the method comprising the steps of:

passing a pressurized fluid into and through a first passageway in a swivel member of said fitting and into a second passageway of said swivel member, said second passageway being in a ball-shaped first end of a swivel member of said fitting, a centerline of said second passageway intersecting a centerline of said first passageway;

passing the fluid from said second passageway and into a reservoir within a housing of said fitting; and, passing the fluid from said reservoir and into and through a third passageway, said third passageway being within said housing. The centerline of the second passageway being perpendicular to a centerline of the third passageway and the swivel member is rotatable a full 360° and tiltable between 0° and 20° in all directions about its center axis.

DESCRIPTION OF THE DRAWINGS

The following is a brief description of the drawings in which like parts may bear like reference numerals and in which.

DETAILED DESCRIPTION OF THE INVENTION

For the purpose of the present discussion, the method and apparatus of this invention is described in connection with the dispensing of a hot melt polymeric material used in an adhesive applications.

Hot melt materials are those materials which are solid at room or ambient temperature but, when heated, are converted to a liquid state. It should be understood that the methods and apparatus of this invention are believed to be equally applicable for use in connection with the dispensing of other heated and unheated fluid materials.

Figure 2:
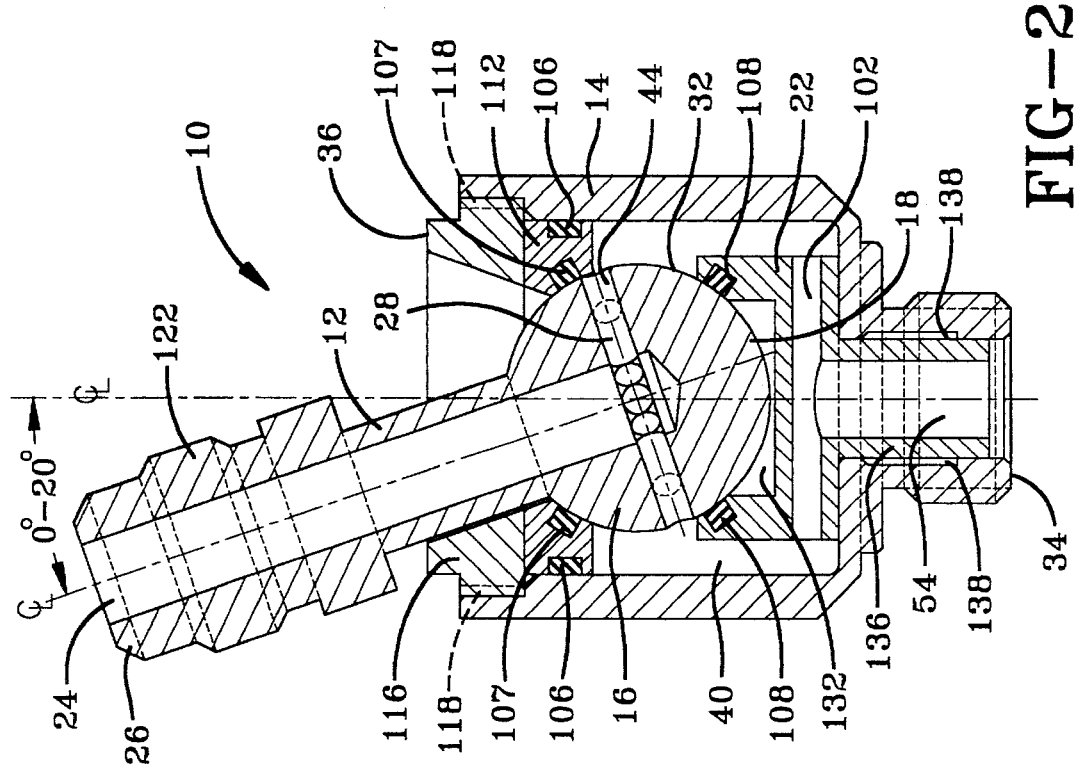
FIG. 2 is a cross-sectional view taken along lines 2—the swivel member of the embodiment shown in FIG. 1.
Figure 1:
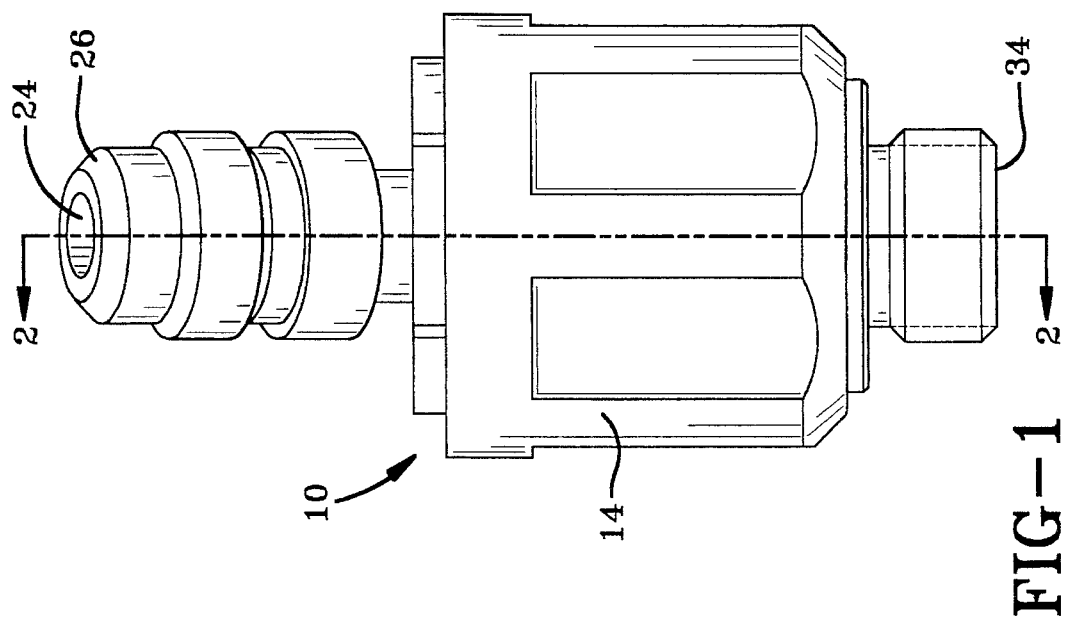
FIG. 1 is a front view of a preferred embodiment of a fitting according to the invention.

Now, with reference to the figures, especially FIGS. 1 and 2, there is illustrated a fitting, shown generally by reference numeral 10, according to one embodiment of the invention. With reference to FIGS. 1 and 2, the fitting 10 includes a swivel member 12 and a housing 14. The swivel member 12 has a ball 16 at a first end 18 and a hose fitting 122 at a second end 26. The ball 16 is rotatably and tiltably received within and supported by socket 22 and seals 112 within the housing 14. The housing 14 and swivel member 12 are made of metal. The swivel member 12 has a first bore 24 which extends from the second end 26 of the swivel member 12 and terminates in and communicates with secondary bores 28. In one preferred embodiment, the secondary bores 28 extend perpendicularly to the first bore 24 and pass through a center of the ball 16, opening into the surface 32 of the ball on opposite sides thereof. In this embodiment, the secondary bores 28 are essentially diameters of the ball 16 and the centerline CL of the first bore 24 bisects each of the secondary bores 28.

The housing 14 includes the socket 22 and has a first end 34 and a second end 36. The housing 14 also includes a reservoir 40 which surrounds a portion of the surface 32 of the ball 16 which includes the outlets 44 of the secondary bores 28. The reservoir 40 is adapted to receive pressurized fluid exiting the outlets 44 of the secondary bores 28 and pass it to a conduit 54 which terminates at the first end 34 of the housing 14.

The swivel member 12 is rotatably and tiltably received within the socket 22 of the housing 14. In the preferred embodiment, the swivel member 12 is rotatable between 0° and 360° and is tiltable between 0° and 20° about the centerline CL of the housing 14, as shown in FIG. 2.

With continuing reference to FIGS. 1 and 2, the socket 22 is a part of a lower insert 136 which includes passageways or tertiary bores 102 which are essentially perpendicular to conduit 54. A compression nut 116 is secured to the housing 14 via threads 118. A floating upper sealing member 112 seals the fluid within the housing 14 and includes O-rings 106,107. O-ring 106 seals the upper sealing member 112 against housing 14 and allows for concentricity variations between the upper and lower sealing surfaces, and the ball. The socket 22 includes a lower seal 108 which keeps fluid from working underneath the ball 16. The lower seal 108 must provide a wiping action to wipe fluid from the surface 32 of the ball 16 to prevent fluid from entering a chamber 132. In the preferred embodiment, the chamber 132 is simply filled with air, although it is foreseeable that the chamber 132 could be filled with another material, such as a lubricant or chemical sealant. The chamber 132 is beneath the ball 16 and, should fluid reach and fill the chamber 132, the fluid pressure could lift the ball 16 from its proper seat in socket 22, thereby jamming it against the upper sealing member 112. The socket 22 is a part of a lower insert 136 which is attached to the housing 14 via threads 138.

Figure 4:
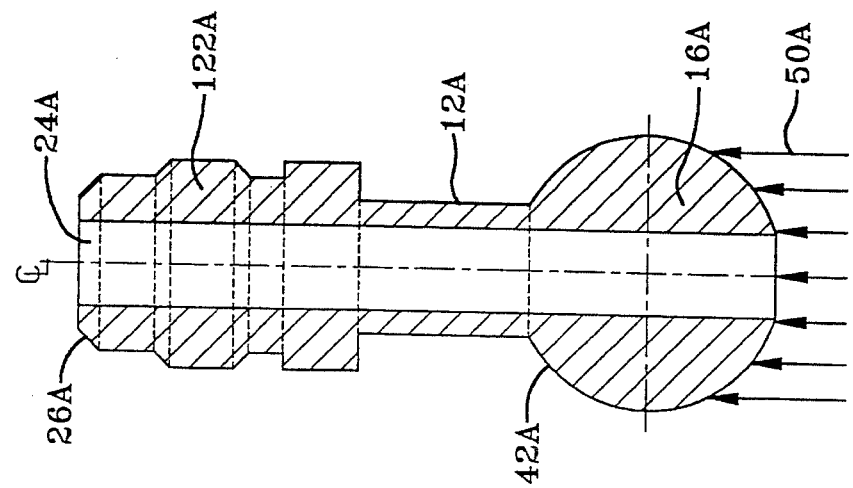
FIG. 4 is a cross-sectional view of a prior art swivel member of the embodiment shown in FIG. 3.
Figure 3:
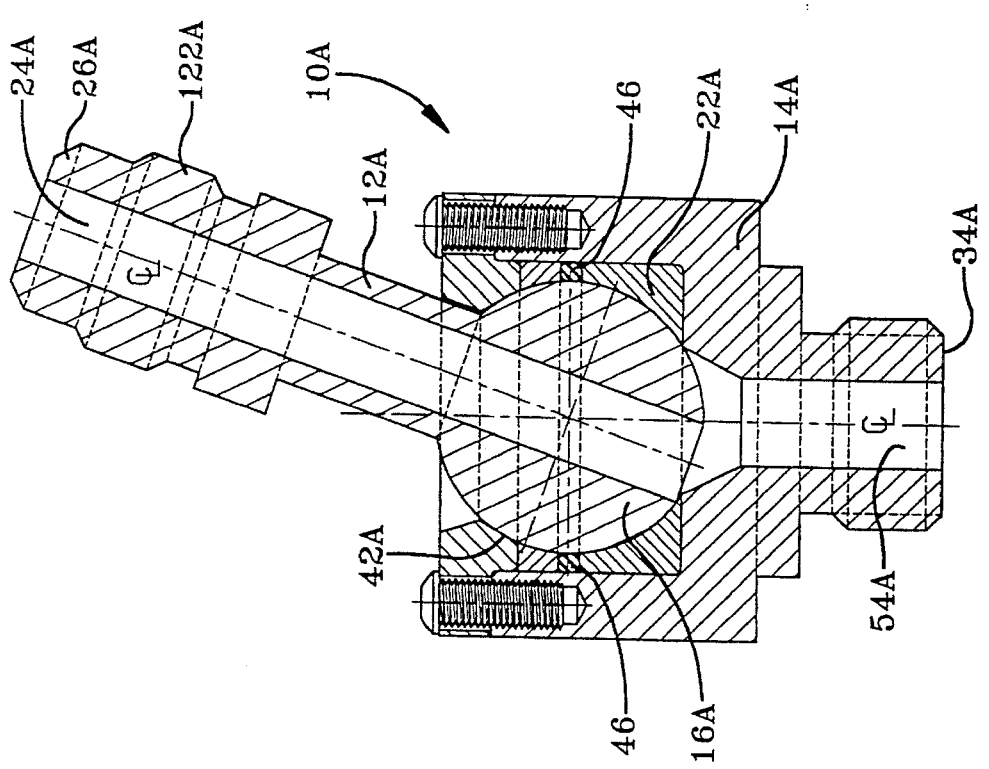
FIG. 3 is a cross-sectional view of a prior art fitting.

With reference to FIGS. 3 and 4, a conventional ball-and-socket type swivel fitting 10A as is used for delivering hot melt adhesives is shown. Those portions of the conventional design which are like or analogous to the embodiment shown in FIGS. 1 and 2 are designated by the same reference number followed by the letter "A." One of the significant differences between the conventional fitting 10A and the inventive fitting 10 is the configuration of the first bore 24A within the swivel member 12A. In the conventional design, the first bore 24A extends throughout the swivel member 12A along the axial centerline CL of the swivel member 12A. As such, when pressurized fluid enters the second end 26A of the swivel member 12A the fluid pushes the ball 16A against the socket 22A. The force so generated is directed along the axis of the swivel member 12A, as is represented by arrows 50A. This loading causes the ball 16A and the swivel member 12A to wedge within the socket 22A, generally occurring at location 42. When this crimping or wedging occurs, it is difficult, or impossible to swivel or tilt the swivel member 12A, therefore frustrating the objective of the fitting 10A.

Another significant difference between the inventive fitting 10 and the conventional fitting 10A includes the provision of reservoir 40 in the inventive housing 14 and the corresponding lack of one in the conventional housing 14A. Because there is no reservoir in the conventional housing 14A, the projected area of the opening of conduit 54A presented to the incoming pressurized fluid exiting the first bore 24A of the swivel member 12A changes depending on the orientation of swivel member 12A. When the centerline CL of swivel member 12A is tilted at a high angle relative to the centerline CL of the housing 14A, the projected area of the conduit 54A throughout which the fluid must pass is an ellipse having an area smaller than the cross-sectional area of first bore 24A. As such, the loading on the fitting 10A is even further increased and the flow rate can become limited.

Figure 6:
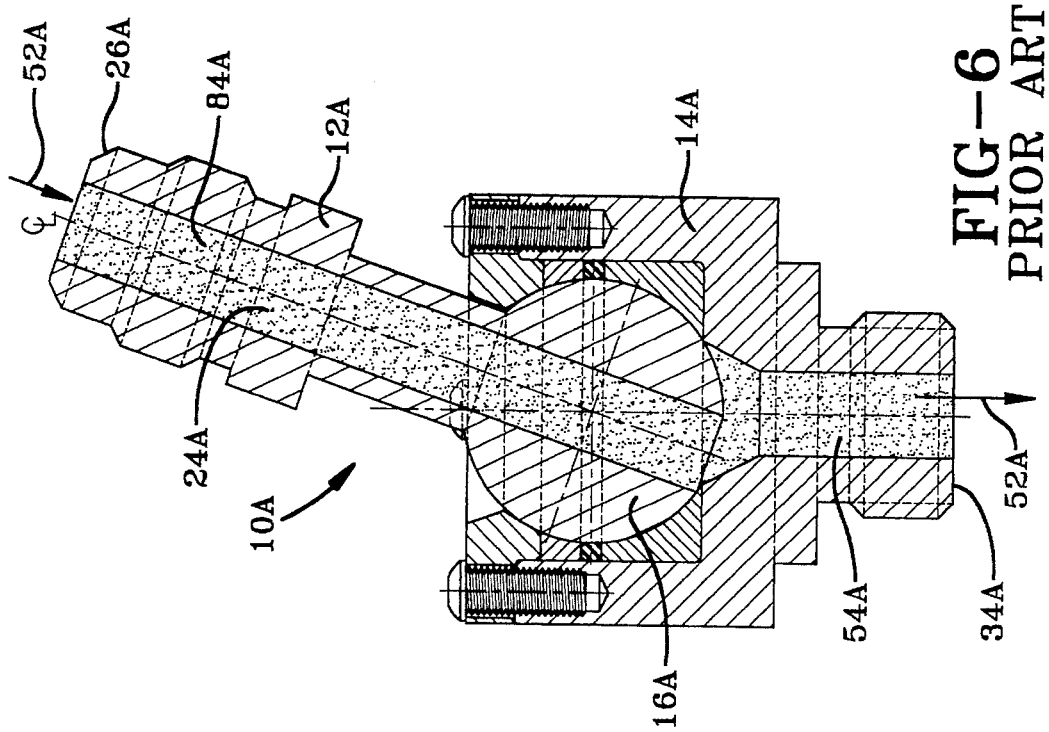
FIG. 6 is a cross-sectional view of the fitting of FIG. 3 showing the fluid path through the fitting.
Figure 5:
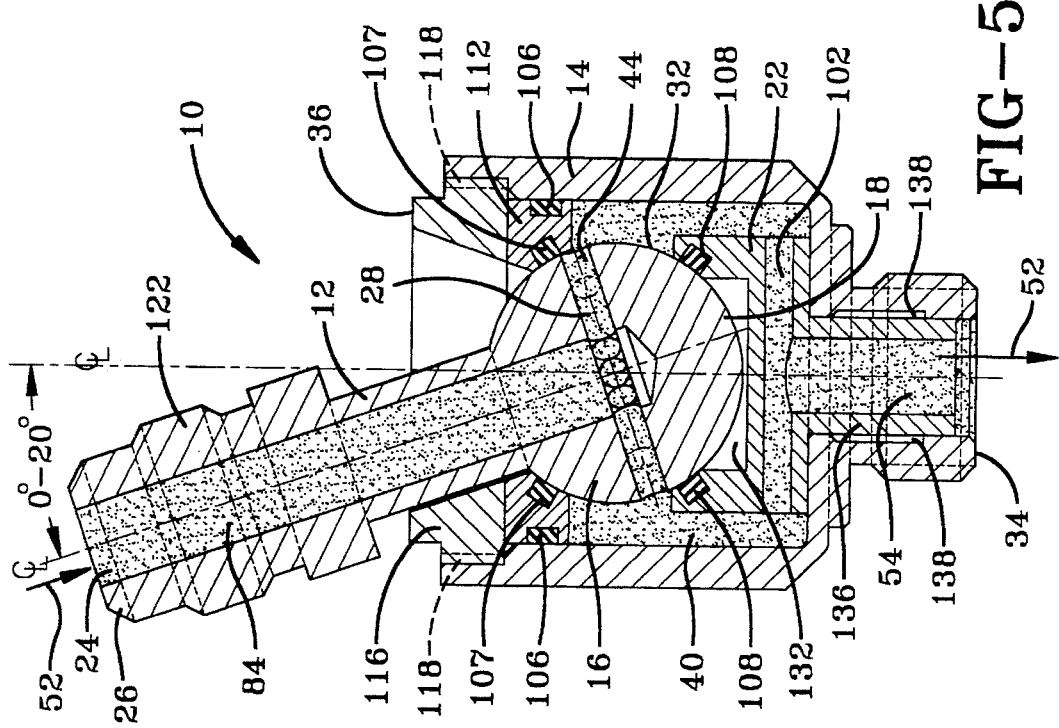
FIG. 5 is a cross-sectional view of the fitting of FIGS. 1 and 2 showing the fluid path through the fitting.

With reference to FIGS. 5 and 6, the operation and advantages of the invention will be described. In the inventive fitting 10, the intended or preferred direction of fluid flow is indicated by arrows 52 although the fitting 10 would work equally well if the flow direction was reversed. Pressurized fluid 84, such as hot melt polymeric adhesive, enters the second end 26 of the swivel member 12. The hot melt adhesive 84 passes through first bore 24 and into secondary bores 28, and finally into reservoir 40. The outlets 44 of the secondary bores 28 are open to the reservoir 40, regardless of the orientation of the swivel member 12. As such, the full surface area of each of the outlets 44 is always open to the pressurized fluid 84 within reservoir 40, in contrast to the projected, elliptical areas presented to the fluid in the prior art fitting 10A. The secondary bores 28 are oriented generally perpendicularly to the axial direction movement of the pressurized fluid 84 within first bore 24. By generally orienting secondary bores 28 in a generally perpendicular to the centerline CL of first bore 24, little or no axial loading of the fluid on the ball 16 of swivel member 12 occurs. Next the fluid 84 exits the reservoir 40, flows through conduit 54, and finally exits the first end 34 of the housing 14.

With reference to FIG. 6, the operation of the prior art fitting 10A will be described and contrasted to the inventive fitting 10. In the prior art fitting 10A, the direction of flow is indicated by arrows 52A. The pressurized fluid 84A enters the second end 26A of the swivel member 12A. The hot melt adhesive 84A passes through first bore 24A and into conduit 54A. Depending on the orientation of the swivel member 12A, the full surface area of first bore 24A will not always be open to the pressurized fluid 84A. When the swivel member 12A is tilted, the area so presented will be a projected, elliptical area. The decreased area increases the axial loading of the fluid 84A on the ball 16A of swivel member 12A. The fluid 84A finally exits the conduit 54A through the first end 34A of the housing 14A.

In the prior art fitting 10A, fluid pressure tends to cause the ball 16A to bind against the inside of the housing 14A. In the inventive fitting 10, the internal fluid pressure acts inwardly on the ball 16 and outwardly on the housing 14, both of which are solid, metallic components which can resist the pressure without any deflection.

Figure 7:
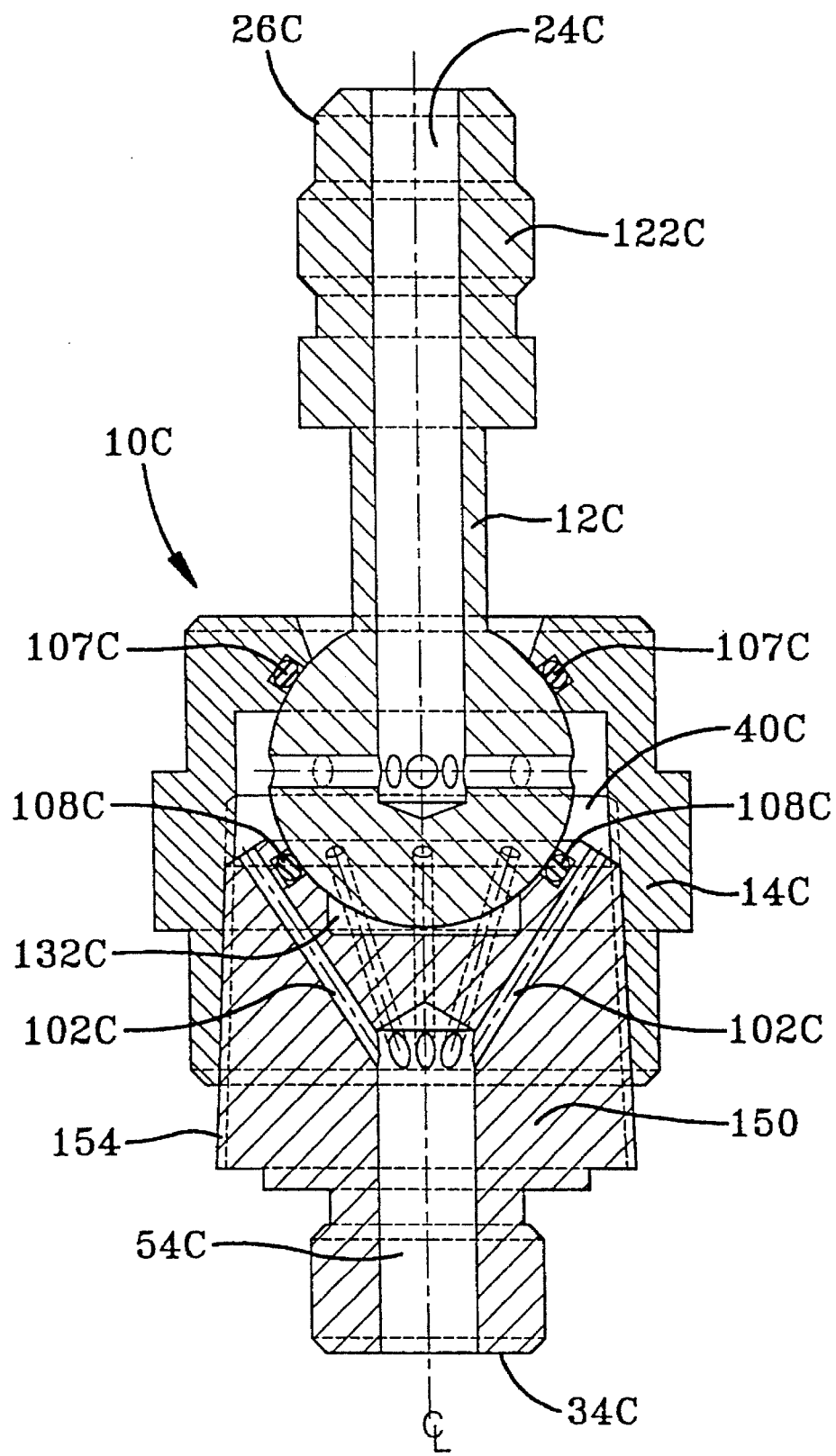
FIG. 7 is a cross-sectional schematic view of a second embodiment of a fitting according to the invention.

With reference to FIG. 7, a second embodiment of the inventive fitting 10C is shown. Again, similar features of the embodiments shown in FIGS. 1 and 2 are identified with the same reference characters followed by the letter "C." In the embodiment shown in FIG. 7, a plurality of passageways or tertiary bores 102C pass fluid from reservoir 40C to conduit 54C. The passageways 102C are angled relative to the centerline CL of the conduit 54C to allow the fluid to flow from chamber 40C to passage 54C. In this embodiment, the centerlines of the passageways 102C make an angle of between 10° and 90° with a centerline CL of conduit 54C. The passageways 102C are located in a lower insert 150 which is attached to housing 14C via threads 154. O-ring 107C seals the fluid from leaking out of the housing 14C and O-ring 108C seals the fluid from chamber 132C.

Figure 8:
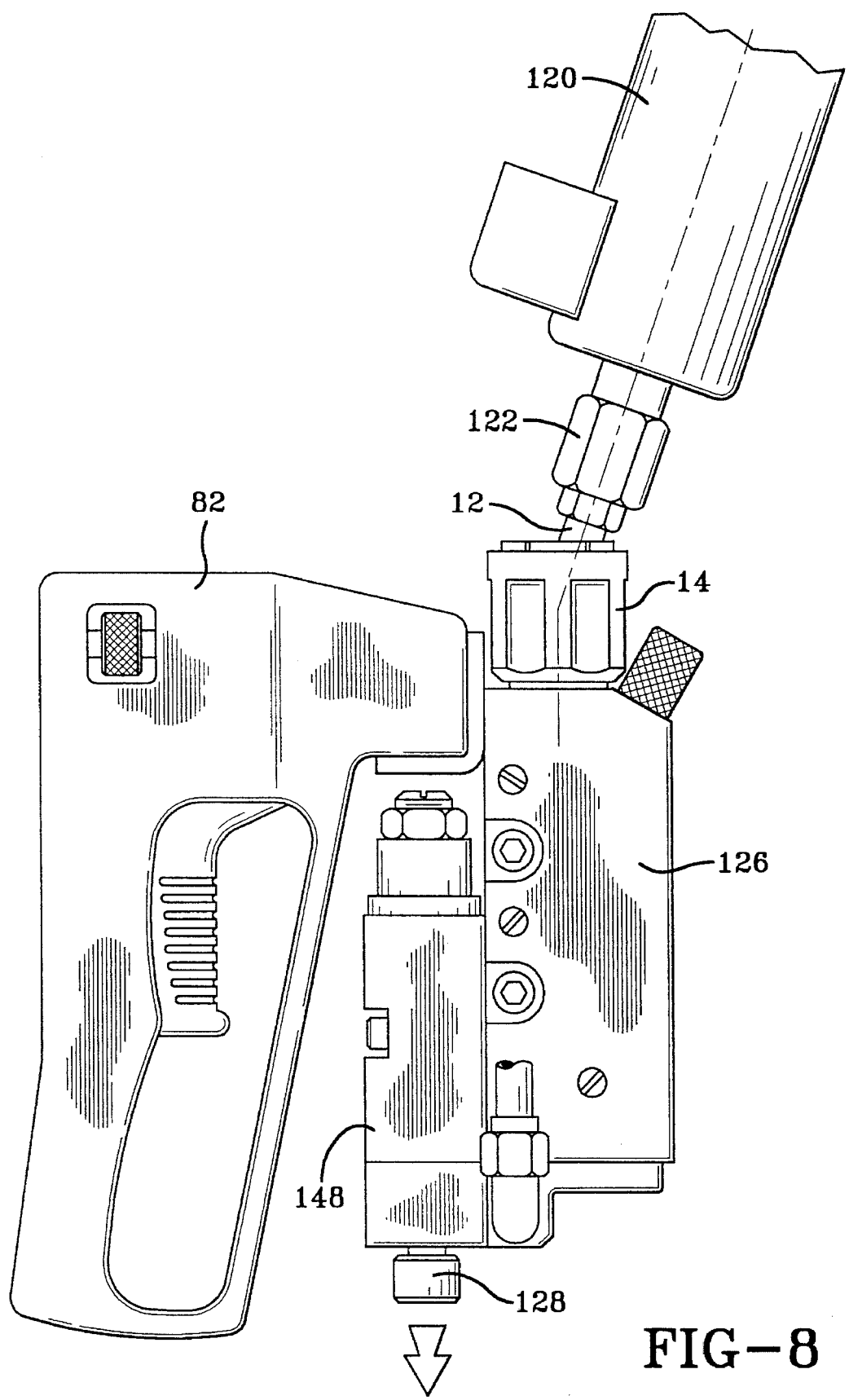
FIG. 8 is a schematic view of a typical environment in which the inventive fitting is utilized to dispense hot melt adhesives or other fluids; and, FIG. 9 is a schematic view of another typical environment in which the inventive fitting might be utilized by a human operator to dispense hot melt adhesives onto a vehicle panel by a hand-held dispenser.

With reference to FIG. 8, one common environment in which the inventive fitting 10 might be used is shown. A source of hot melt adhesive, or other fluid, is operatively affixed to hose 120, which is in turn connected to hose fitting 122, which is connected to swivel member 12. The housing 14 is connected to a conventional hot melt adhesive dispenser which includes a gun body 126 and module 148. The dispenser 126 normally includes an RTD, conduits, heat source, and other components (not shown) which are known in the art and are necessary to properly dispense a hot melt adhesive. The hot melt adhesive travels from the hose 120, through the swivel member 12 and housing 14, into the gun body 126, into the module 148 and eventually out a nozzle 128 to be applied to a substrate (not shown) in the desired manner.

Figure 9:
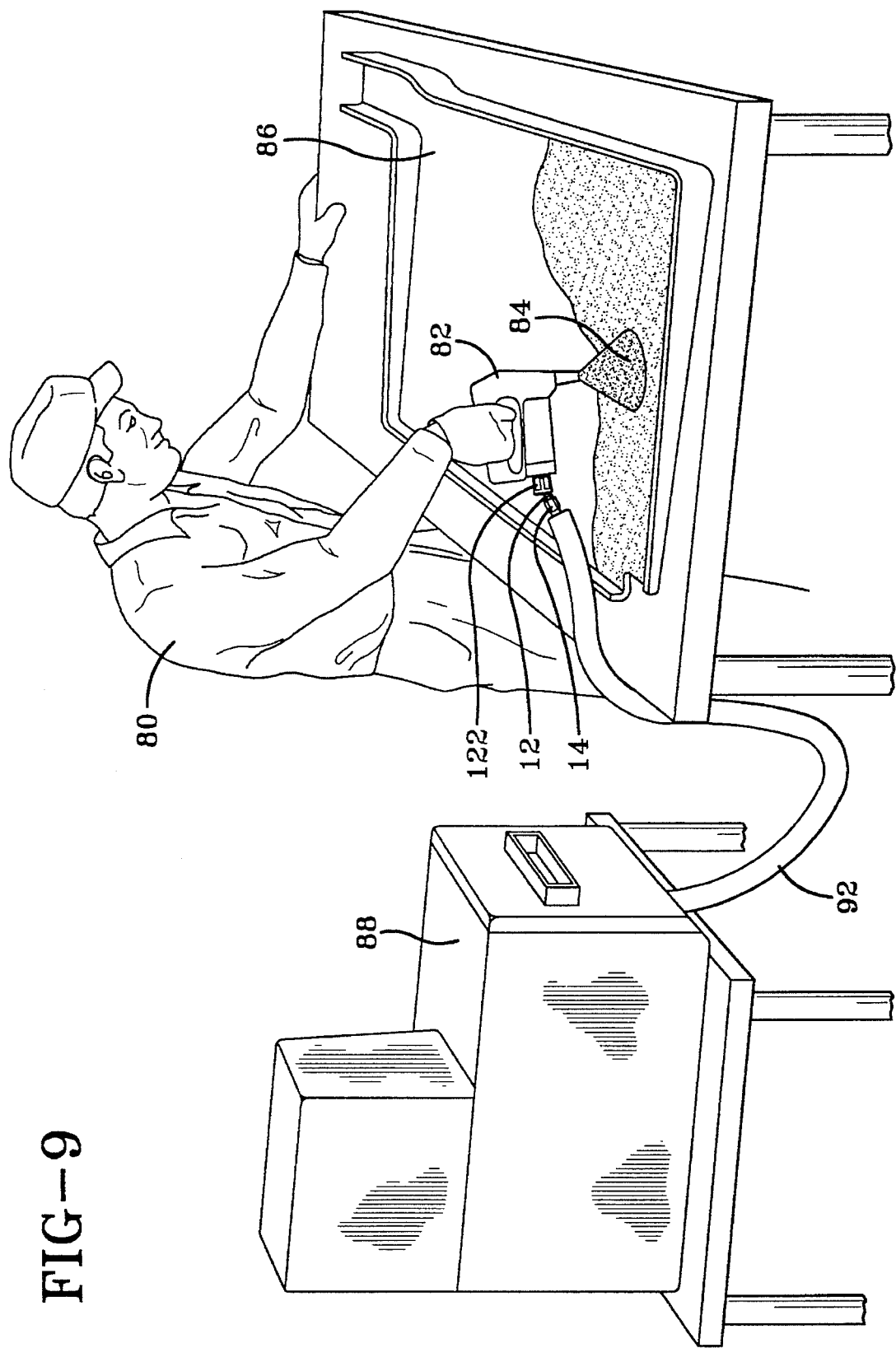

With reference to FIG. 9, another environment in which the fitting 10 might be used is shown. A human operator 80 is illustrated utilizing a hand gun 82 to dispense hot melt adhesive 84 onto a substrate, such as a door panel 86 for an automotive vehicle. The hot melt adhesive 84 is heated within a heated storage unit 88 and passes through hose 92 into the hand gun 82. The use of the inventive fitting 10 in such application should improve the ease of operation and reduce the possibility of Carpal tunnel syndrome and other discomforts to the human operator 80. The fitting 10 is especially suitable for environments in which the hand gun 82 is suspended from overhead and the hot melt adhesive 84 is discharged downwardly.

While certain representative embodiments and details have been shown for the purpose of illustrating the invention, it will be apparent to those skilled in the art that various changes and modifications can be made therein without departing from the scope of the invention.

It is claimed:

1. A fluid fitting comprising:

a swivel member, said swivel member having a ball at a first end, said swivel member having a first bore extending from a second end of said swivel member and terminating in and communicating with a secondary bore;

a housing, said housing having a socket therein, said housing also having a first and second ends, a conduit extending between said first end of said housing and said socket, said ball of said swivel member being received within said socket, said housing further comprising a reservoir, said reservoir surrounding a portion of a surface of said ball and passing an associated fluid from said secondary bore in said ball to said conduit in said housing;

sealing means for sealing fluid within said fluid fitting; and, a compression nut, said compression nut being selectively screwed into an opening in said second end of said housing, said compression nut having threads corresponding to threads on an inner surface of said housing; said compression nut retaining said swivel member within said housing.

2. The fitting of claim 1 wherein said compression nut further comprises a conical bore therethrough, said conical bore having angled side walls which enable said swivel member to tilt within a range of 0° to 20°.

3. The fitting of claim 2 wherein said fitting is adapted for use with hot melt adhesive.

4. The fitting of claim 2 wherein said housing further comprises:

a passageway in said socket, a first end of said passageway being in communication with said reservoir and a second end being in communication with said first end of said housing, said passageway making an angle of between 10° and 90° with a centerline of said conduit.

5. The fitting of claim 2 wherein said socket of said housing is cup-like, having an inner edge and an outer edge, said inner edge defining a chamber.

6. The fitting of claim 5 wherein said sealing means comprises a seal, said seal mounted in said inner edge and engaging said ball, sealing said chamber.

7. The fitting of claim 6 wherein a portion of a surface of said ball is within said chamber, said portion of said surface of said ball being prevented from coming into contact with the associated fluid by said seal and said socket.

8. The fitting of claim 5 wherein said socket of said housing includes a tertiary bore, said tertiary bore being generally perpendicular to said conduit in said housing and passing said associated fluid from said reservoir to said conduit.

9. The fitting of claim 5 wherein said sealing means comprises:

an upper sealing member, said upper sealing member being positioned between said compression nut and said surface of said ball; and, a second seal, said second seal mounted in said upper sealing member and sealing it against said surface of said ball.

10. The fitting of claim 9 wherein said sealing means comprises a third seal, said third seal mounted in said upper sealing member and sealing said upper sealing member against an interior surface of said housing.

11. The fitting of claim 1 wherein said secondary bore extends from a first point on a surface of said ball to said first bore of said ball.

12. The fitting of claim 11 wherein a centerline of said secondary bore is linear.

13. The fitting of claim 1 further comprising a plurality of secondary bores, each of said secondary bores extending from a point on a surface of said ball to said first bore of said ball.

14. The fitting of claim 1 wherein said first and secondary bores intersect at a center of said ball.

15. The fitting of claim 14 wherein said fitting is adapted for use with a downwardly discharging gun module dispensing said hot melt adhesive.

16. The fitting of claim 1 wherein centerlines of said first and secondary bore are perpendicular.

17. The fitting of claim 1 wherein said ball is rotatable within said socket between 0° and 360°.

18. The fitting of claim 1 wherein said ball is tiltable between 0° and 20°.

19. A fluid fitting comprising:

a swivel member, said swivel member having a ball at a first end, said swivel member having a first bore extending from a second end of said swivel member and terminating in and communicating with a secondary bore;

sealing means for sealing fluid within said fluid fitting; and, a housing, said housing having a socket therein, said housing also having first and second ends, a conduit extending between said first end of said housing and said socket, said ball of said swivel member being received within and cooperating with said socket, said housing further comprising a reservoir, said reservoir surrounding a portion of a surface of said ball and passing said associated fluid from said secondary bore in said ball to said conduit in said housing, said socket of said housing comprising a tertiary bore, said tertiary bore being generally linear and making an angle between 10° and 80° with said conduit in said housing and passing said associated fluid from said reservoir to said conduit.

20. The fluid fitting of claim 19 wherein a plurality of tertiary bores are disposed in said socket of said housing and are disposed in a generally conical configuration.

* * * * *